United States Patent [19]

Vaughen

[11] Patent Number: 5,137,228
[45] Date of Patent: Aug. 11, 1992

[54] ROTARY WING WITH TORSIONALLY FLEXIBLE BLADES

[76] Inventor: Jack F. Vaughen, 26807 Spring Creek Rd., Rancho Palos Verdes, Calif. 90274

[21] Appl. No.: 519,666

[22] Filed: May 7, 1990

[51] Int. Cl.$^5$ .............. B64C 3/48; B64C 11/12; F04D 29/36
[52] U.S. Cl. .............. 244/17.25; 244/38; 244/7 C; 244/123; 416/134 A; 416/148
[58] Field of Search .............. 244/17.11, 219, 123, 244/38, 7 R, 7 A, 7 C; 416/147, 148, 149, 168 R, 134 A, 132 R, 226

[56] References Cited

U.S. PATENT DOCUMENTS

| | | | |
|---|---|---|---|
| 1,988,085 | 1/1935 | Orlando | 244/123 |
| 2,369,049 | 2/1945 | Hays | 416/132 |
| 3,404,737 | 10/1968 | Keder, Jr. | 244/7 R |
| 3,486,717 | 12/1969 | Paine | 244/7 A |
| 3,528,753 | 9/1970 | Dutton et al. | 244/123 |
| 3,589,831 | 6/1971 | Lemnios | 416/132 |
| 3,637,168 | 1/1972 | Ryan et al. | 244/7 A |
| 3,799,700 | 3/1974 | Brockhuizen et al. | 416/226 |
| 3,902,821 | 9/1975 | Robinson | 416/132 |
| 4,028,003 | 6/1977 | Krauss | 416/132 R |
| 4,142,697 | 3/1979 | Fradenburgh | 244/7 R |
| 4,332,525 | 6/1982 | Cheney, Jr. | 416/134 A |
| 4,714,409 | 12/1987 | Denison et al. | 416/134 A |
| 4,792,280 | 12/1988 | Olsen et al. | 416/134 A |
| 4,979,698 | 12/1990 | Lederman | 244/7 R |

Primary Examiner—Joseph F. Peters, Jr.
Assistant Examiner—Virna Lissi Mojica

[57] ABSTRACT

A controllable lifting rotary wing for an aircraft wherein each rotor blade is of torsionally flexible construction and control may be accomplished by twisting the rotor blades. The root end of each blade is mounted to a central hub by means which allow both beamwise flapping and blade twist. The blade root mounting angle may be either variable or fixed. The blade twists uniformly from this root angle to a variable tip angle. Twist of the rotor blades is accomplished through the mechanism of shear flows. Blade twist angle may be automatically established by a balance of dynamic forces on the blade which cause twist angle to increase as root mounting angle is increased. Alternatively, blade twist angle may be manually controlled also. A unique feature of the torsionally flexible blade is that it is hollow throughout its entire span so it is well suited for ducting gases through the interior of the blade to tip-mounted jet propulsion units if desired.

24 Claims, 9 Drawing Sheets

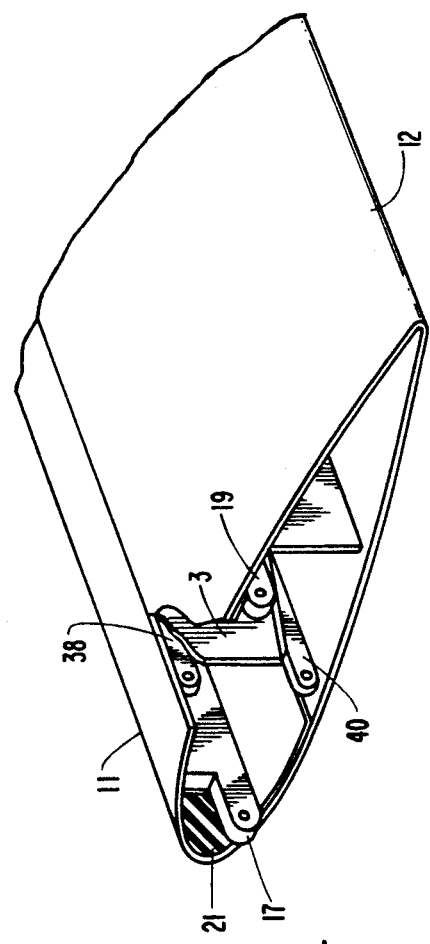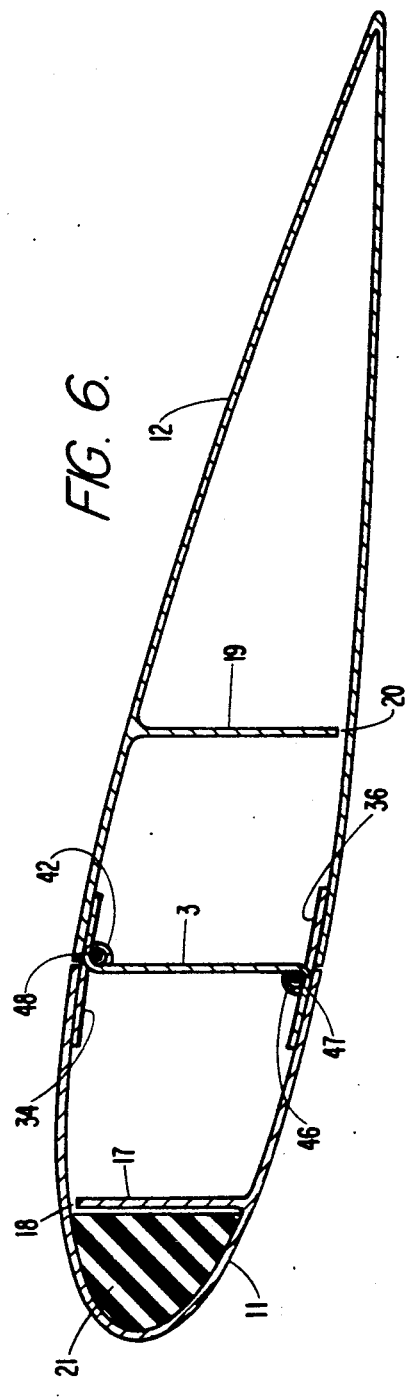

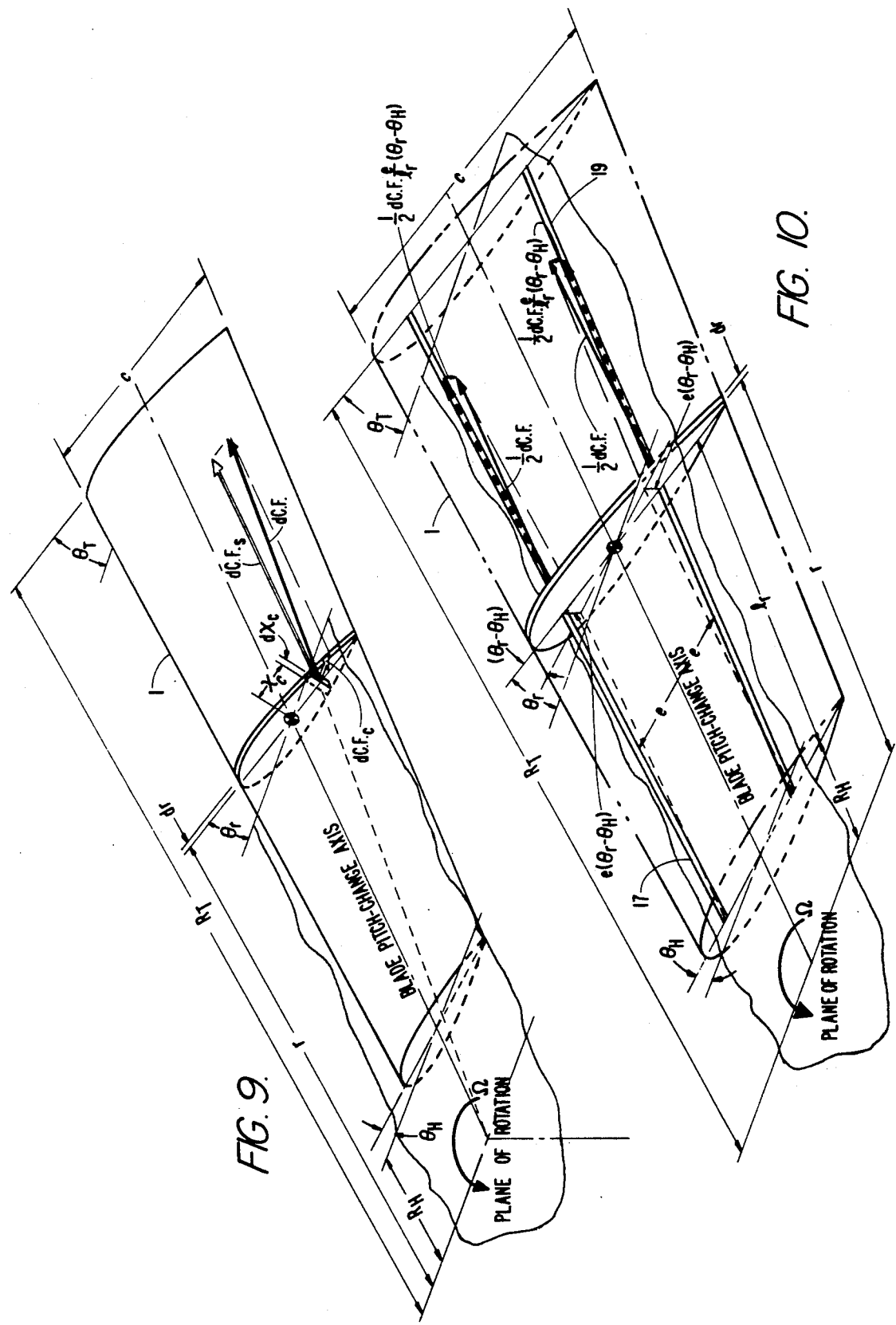

ROTARY WING WITH TORSIONALLY FLEXIBLE BLADES

BACKGROUND OF THE INVENTION

The rotary wing of this invention is particularly applicable to that class of rotary wing aircraft known as "tilt-rotor convertiplanes". These aircraft resemble conventional airplanes but have lifting rotors mounted at their wingtips. These lifting rotors are mounted to the wing structure through journal bearings mounted on the spanwise axis of the wing. These bearings allow the rotor shaft to be vertical for operation as a helicopter for hovering and low speed flight. However, as forward flight speed increases, the fixed wing of the aircraft develops aerodynamic lift and the rotor shafts tilt forward allowing the lifting rotors to function as propellers. For optimum performance of such a dual purpose rotor it is desired that blade root angle and blade twist be relatively small in the helicopter mode. However, as the rotor tilts forward to become a propeller, propulsive efficiency will be improved if the blade root angle is increased and blade twist is increased. The rotary wing described herein makes such a transition feasible. Thus, this variable twist rotor provides optimum blade twist for helicopter flight and automatically increases blade twist during conversion to airplane configuration to also provide optimum blade twist for propeller operation.

SUMMARY OF THE INVENTION

The invention teaches that performance of certain types of rotary wing aircraft can be improved if a lifting rotor blade is capable of changing its twist angle between root and tip during flight to optimize twist angle for different flight regimes. This capability is particularly desirable in that class of rotary wing aircraft known as "tilt-rotor convertiplanes". A design problem arises in such aircraft because optimum blade twist and root angle for helicopter flight is substantially less than corresponding angles for propeller operation.

This design problem is overcome by the rotor blade of this invention which is constructed to have negligible torsional stiffness. This is accomplished by making the rotor blade entirely of open-section beam elements. Such open-section beams combine high beamwise bending strength with virtually zero torsional stiffness. In the rotary wing which comprises this invention, these open-section beam elements are attached together in such a manner that their torsional flexibility is maintained. When an open-section beam is twisted, its spanwise edges move a small distance relative to each other in the spanwise direction. It is a feature of the present invention that adjacent open-section beam elements are attached together with spanwise slidable joints between their edges so that relative movement of these edges can occur without resistance. The result is a rotor blade with beam strength but virtually no torsional stiffness.

Such a torsionally flexible rotor blade can be mounted to a central hub with either a fixed or variable root angle. A fixed root angle has advantages when used on a helicopter rotor powered by reaction jets mounted at the blade tips. Typically, such reaction jets require the passage of propulsive gases through the central hub and radially outward through the blades to the jets at the tips. The torsionally flexible blade of this invention is hollow from root to tip and therefore can serve as a duct for these propulsive gases. Twist of the blade does not inhibit flow of these gases and mounting the blade to the central hub with a fixed root angle facilitates free flow of gases through the hub and out into the blades.

On the other hand, mounting the torsionally flexible blade to the central hub with a variable root angle is necessary for operation as a dual purpose rotor for a tilt-rotor convertiplane. In that application, blade root angle for helicopter flight must be substantially less than the root angle for airplane flight where the rotor functions as a propeller. The invention describes alternate configurations of a rotary wing with torsionally flexible blades having the blade root angle either fixed or variable. With the fixed root angle, control is accomplished by manual twist of the torsionally flexible blades. Means are described for controlling both collective and cyclic variations in blade twist. On the other hand, with a variable blade root angle, control is accomplished by collective and cyclic adjustment of this root angle. Since the blade is free to twist in response to dynamic forces imposed upon it during operation, blade twist angle automatically increases as blade root angle increases. Thus, the torsionally flexible rotor blade is capable of automatically adjusting its twist angle as the rotor converts from helicopter to airplane propeller configuration when installed on a tilt-rotor convertiplane.

BRIEF DESCRIPTION OF THE DRAWINGS

In the drawings which are to be regarded as merely illustrative;

FIG. 5 is a perspective assembled view of the torsionally flexible blade of FIG. 4, FIG. 6 is a cross-sectional assembled view of the torsionally flexible blade of FIG. 4, FIG. 9 is a schematic perspective view of one torsionally flexible blade showing incremental centrifugal forces on one chordwise element of the blade skin, FIG. 10 is a schematic perspective view of one torsionally flexible blade showing incremental centrifugal forces on one spanwise segment of the blade.

DESCRIPTIONS OF THE INVENTION

Figure 1:
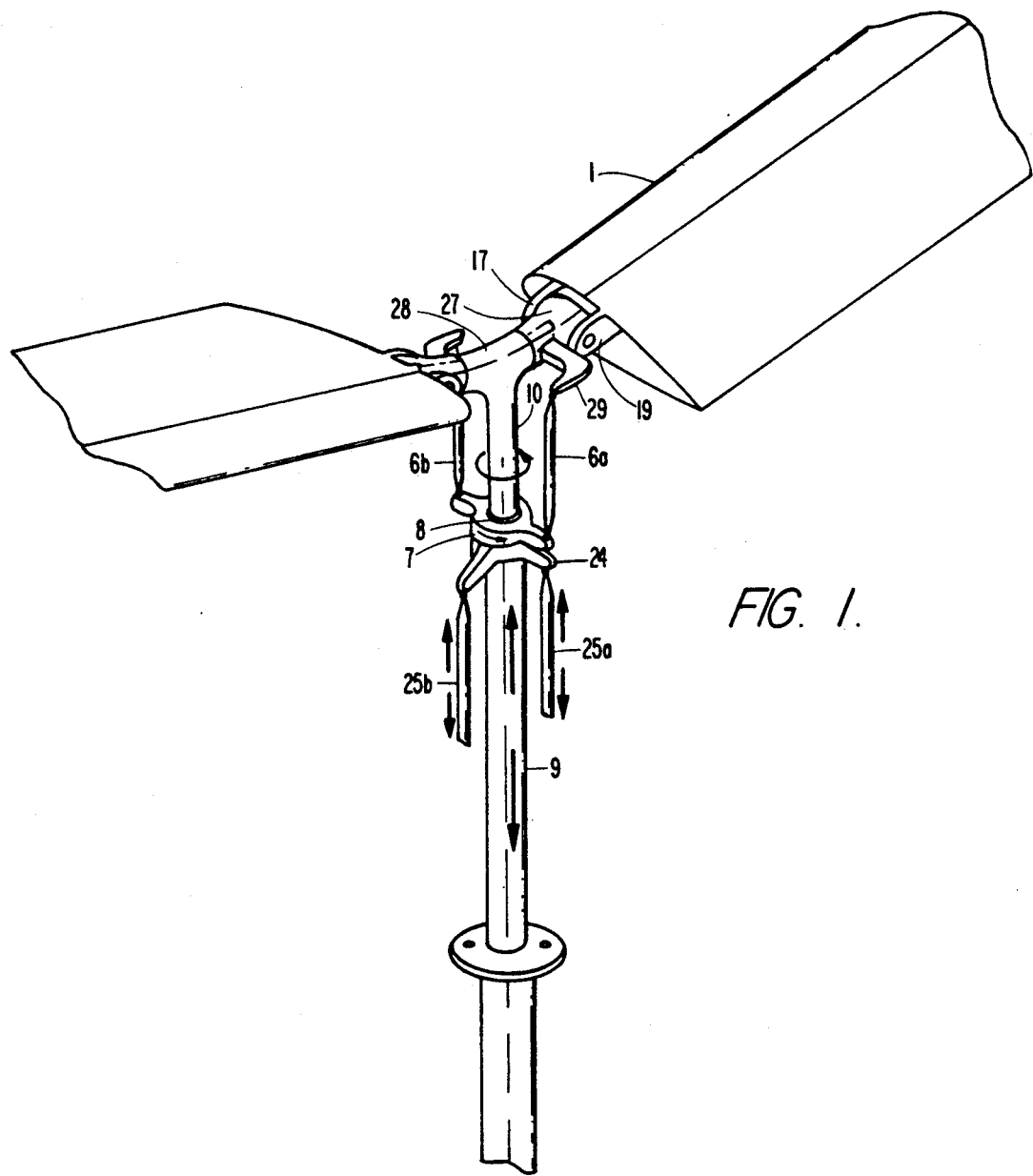
FIG. 1 is a pictorial view of a rotary wing with torsionally flexible blades mounted to a central hub with a variable root angle.

FIG. 1 shows a rotary wing with torsionally flexible blades. This rotary wing may consist of any number of lifting rotor blades attached to a common central hub.

In FIG. 1 a two-bladed rotor is shown for simplicity of illustration. In this rotary wing, each torsionally flexible rotor blade 1 has secondary spars 17 and 19 which project radially inward from the root end of the rotor blade. They are reinforced at their inboard ends and have chordwise holes to provide means of attaching the blade to the central hub with beamwise flapping freedom. In this embodiment of the invention, however, the blade is not attached directly to the hub but mounts instead to rotatable yoke 27 which in turn is attached to one radial arm of central hub 28 through axial thrust bearing means. These bearings may be of any type familiar to helicopter designers provided they have the required rotational range and are capable of withstanding centrifugal and other forces developed on them during operation.

Each yoke 27 is fitted with a pitch control horn 29. The end of each pitch control horn is attached through universal bearing means to a pitch link 6a,b. The opposite ends of these pitch links are attached through universal bearing means to the outer ends of radial arms of rotating portion 7 of the swashplate. Pitch links 6a,b are preferably of adjustable length to affect blade tracking. The swashplate assembly (which consists of rotating portion 7 and non-rotating portion 24) is mounted to tube 9 through spherical bearing 8 for tilt in any direction. The degree of tilt is controlled by push-pull rods 25a and 26b. The push-pull rods may be actuated by any conventional cyclic pitch control mechanism (not shown in FIG. 1). Tube 9, to which the swashplate is mounted, can also be displaced axially as shown by the arrows to rotate yokes 27 collectively relative to the hub arms thereby affecting collective adjustment of root angle of the rotor blades. By displacing tube 9 axially as the rotor shaft tilts from helicopter to airplane configuration, the root angles of all blades can be increased from the optimum value for a helicopter rotor to the optimum value for an airplane propeller.

Figure 2:
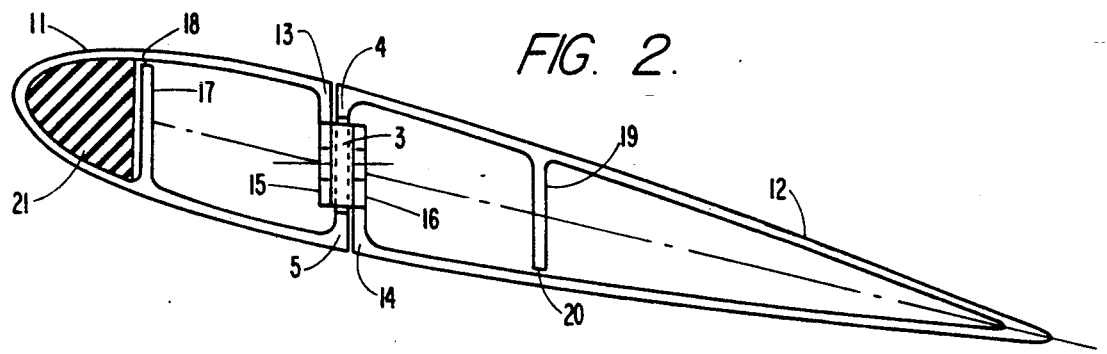
FIG. 2 is a profile view of the root end of one torsionally flexible blade.

FIG. 2 shows an enlarged profile view of the root end of one torsionally flexible rotor blade. This blade has structural beamwise stiffness combined with torsional flexibility. It is well known to structural engineers that an open channel section has these characteristics when used as a beam. A unique feature of this invention is a hollow blade construction of closed cross-section that consists of open channels assembled together in such a manner that their torsional flexibility is retained. This blade consists of a main spar 3 which is fixedly connected to the aft blade skin along its upper edge 4 and to the forward blade skin along its lower edge 5. Forward skin 11 is contoured as shown to form the leading portion of the blade airfoil section and aft skin 12 is shaped as shown to form the trailing portion of the blade airfoil section.

Forward skin 11 and spar 3 together constitute a structural beam of "D" cross-section. However, to retain torsional flexibility of this beam, upper spanwise edge 13 of the forward skin is allowed to remain "free" by mounting it to spar 3 through attachment means which allow it to slide freely relative to the spar through a small spanwise distance. This slidable attachment is represented schematically in FIG. 2 as a small gap between the parts which slide freely relative to each other. Aft skin 12 and spar 3 together constitute a structural beam of elongated "D" cross-section. However, to retain torsional flexibility of this beam, lower spanwise edge 14 of the aft skin is allowed to remain "free" by mounting it to spar 3 through slidable attachment means that allow it to slide freely relative to the spar through a small distance in the spanwise direction.

Secondary spars may also be employed in the construction of the torsionally flexible rotor blade. As shown in FIG. 2, a forward secondary spar 17 projects upward from the inside lower surface of forward skin 11. The upper edge of this secondary spar may be attached at 18 to the inside upper surface of skin 11 by a slidable attachment of the type previously described. Similarly, an aft secondary spar 19 projects downward from the inside upper surface of aft skin 12. The lower edge of this secondary spar may be attached at 20 to the inside lower surface of skin 12 by a slidable attachment of the type previously described. These secondary spars also project radially inboard from the root end of the rotor blade. They are reinforced at their inboard ends and are drilled with chordwise holes to provide means for attaching each rotor blade to the central hub as shown (17, 19) in FIG. 1. To balanced the torsionally flexible blade in the chordwise direction, ballast weight 21 is placed inside of forward skin 11. This ballast weight is preferably made of relatively heavy, torsionally flexible material (such as neoprene rubber for example) and can be attached to the inside surface of skin 11 by bonding along its entire length. (Note that it is not bonded to secondary spar 17 since this would interfere with the desired relative motion between the parts at "free" edge 18).

Figure 3:
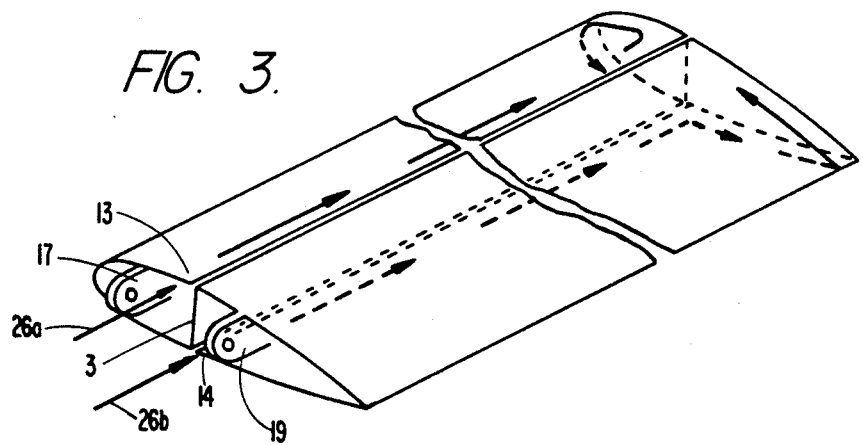
FIG. 3 is a perspective schematic view of one torsionally flexible blade with spanwise control forces applied thereto.

A rotor blade constructed as described has virtually no structural stiffness in torsion. This is because one edge of each skin section has freedom to move a small distance in the spanwise direction relative to the main spar whenever the blade twists. FIG. 3 illustrates the spanwise movement of free edges 13, 14 as the blade twists so that the tip rotates nose-down relative to the root. Free edge 13 moves outboard as shown by arrows 26a and free edge 14 moves outboard as shown by arrows 26b. In accordance with the principle of "shear flows", if these arrows represent control forces for example, when they reach the tip of the blade they turn to follow the edge of the skin at the blade tip as shown. The result is a nose-down twisting moment and torsional rotation of the blade tip relative to the root.

Figure 4:
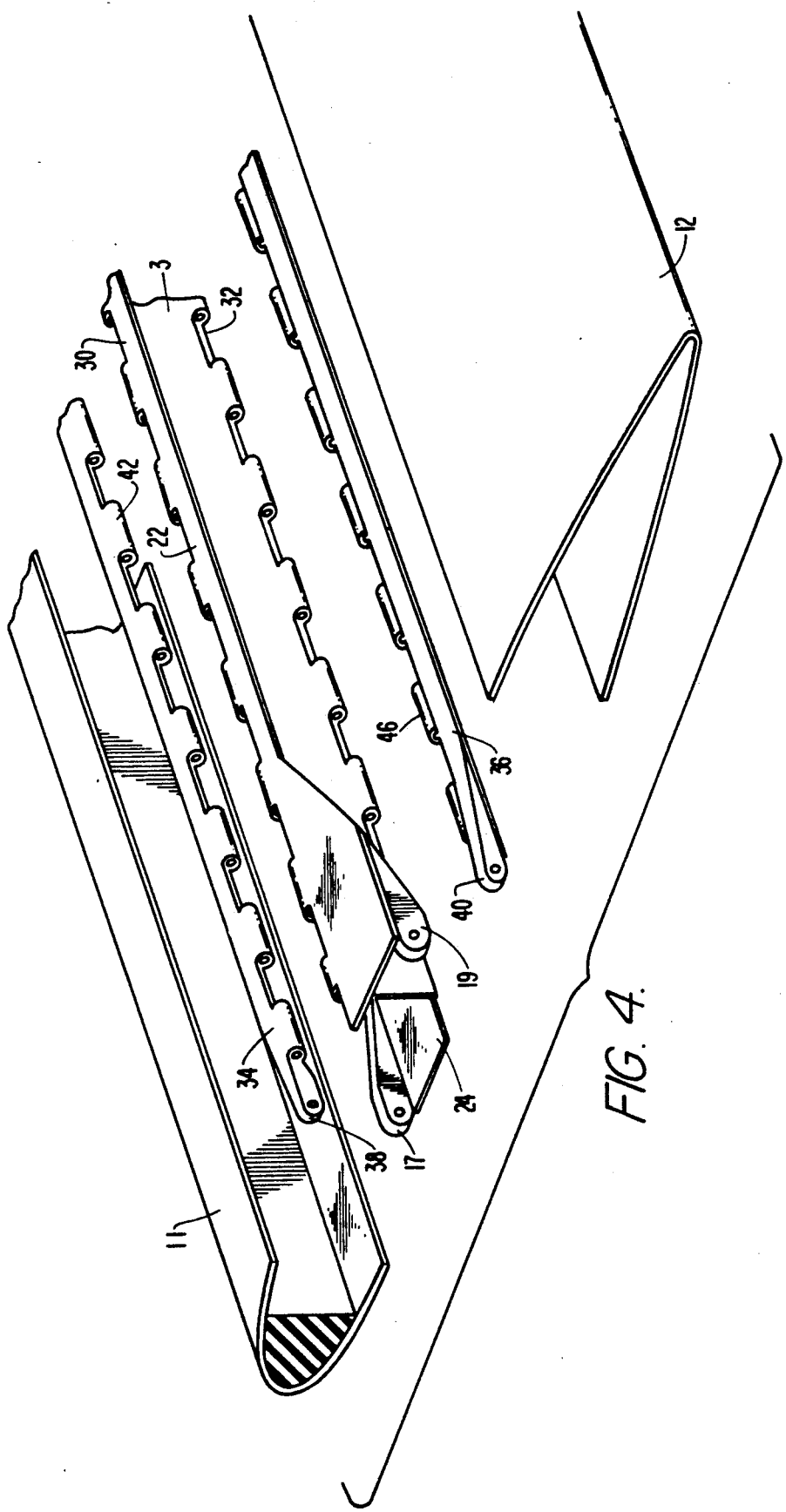
FIG. 4 is an exploded perspective view of one configuration of a torsionally flexible blade.

One method of providing freedom of movement of spanwise skin edges 13, 14 relative to spar 3 is shown in FIGS. 4, 5 and 6. These figures are intended to be illustrative only. Details of an actual rotor blade may deviate from the design shown without departing from the scope of the invention. FIG. 4 is an exploded view of one rotor blade From this figure it is clear that the rotor blade basically consists of only five structural parts. These parts are either channels, Z-sections or flat strips, all of which individually have low structural stiffness in torsion. The rotor blade of this invention combines these structural parts in such a manner that the assembled blade, which is shown in FIG. 5, is also flexible in torsion.

Referring to FIG. 4, main spar 3 consists of an open "Z" section (which may be formed from light gage spring steel for example). The flanges of this Z-spar may be widened as they approach the blade root to provide support structure for blade mounting fittings as shown. These fittings attach the blade to the central hub and define the flapping hinge axis. Sliding spar caps 34, 36 are fixedly attached to the free edges of the blade skins and provide for attachment of the skins to the Z-spar along these free edges. Each of these sliding spar caps resembles one flap of a piano hinge and an attachment fitting 38, 40 may be mounted on the root end of each as shown. These fittings are useful for applying spanwise control forces to the sliding spar caps if desired. Hinge loops 42 and 46 of the sliding spar caps are cooperatively interspersed between corresponding retention means on the spar when the blade is assembled. The retention means illustrated in FIG. 4 comprise evenly spaced spanwise portions of the spar separated by spanwise elongated cutouts at the upper and lower extremities of the spar. After each sliding spar cap is positioned between retaining portions of the spar, a spanwise pin is threaded through the hinge loops of the spar cap. This pin is then fixedly attached to the inner surface of the corresponding bend in the Z-spar. This effectively attaches each sliding spar cap to the spar. However, spar cap hinge loops 42, 46 have shorter spanwise length than the corresponding spanwise spacing between retaining portions of the spar. Therefore, each spar cap is free to slide a small spanwise distance relative to the spar. When assembled in this manner, main spar 3 and sliding spar caps 34, 36 comprise an I-beam which has substantial beamwise strength combined with negligible torsional stiffness.

Spanwise pins which attach sliding spar caps 34, 36 to main spar 3 are not shown in FIGS. 4 and 5. However, FIG. 6 shows a full cross-section of the assembled blade. This figure illustrates how the upper edge of trailing skin channel 12 and the lower edge of leading skin channel 11 are attached to the spar. The sliding spar caps 34, 36 are mated with spar 3 as previously described and are attached respectively to the upper edge of leading skin channel 11 and to the lower edge of trailing skin channel 12. The spanwise pins which attach the sliding spar caps to the main spar are indicated by black circles 47 and 48 in FIG. 6. After the sliding spar caps have been mated to the spar as described, these pins are threaded through the hinge loops in the sliding spar caps (42 and 46 in FIG. 4). The pins are then fixedly attached to the inside surfaces of the upper and lower bends in the Z-spar at spanwise points between the hinge loops to permanently mount the sliding spar caps to the main spar.

In addition to the main spar of the torsionally flexible rotor blade, spanwise secondary spars 17, 19 may be installed as shown in FIG. 2. As previously described, secondary spar 17 may have a slidable connection 18 to the forward skin and secondary spar 19 may have a slidable connection 20 to the aft skin. These slidable connections may be similar to the ones for the main spar described above wherein the spanwise secondary spar includes one flap of a piano hinge, the other flap of the piano hinge is fixedly attached to the blade skin and the hinge loops of at least one part of the piano hinge are shortened to allow spanwise relative motion between the two parts of the piano hinge when they are assembled onto a common spanwise hinge pin. This slidable attachment will typically extend the full spanwise length of the secondary spar.

Figure 7:
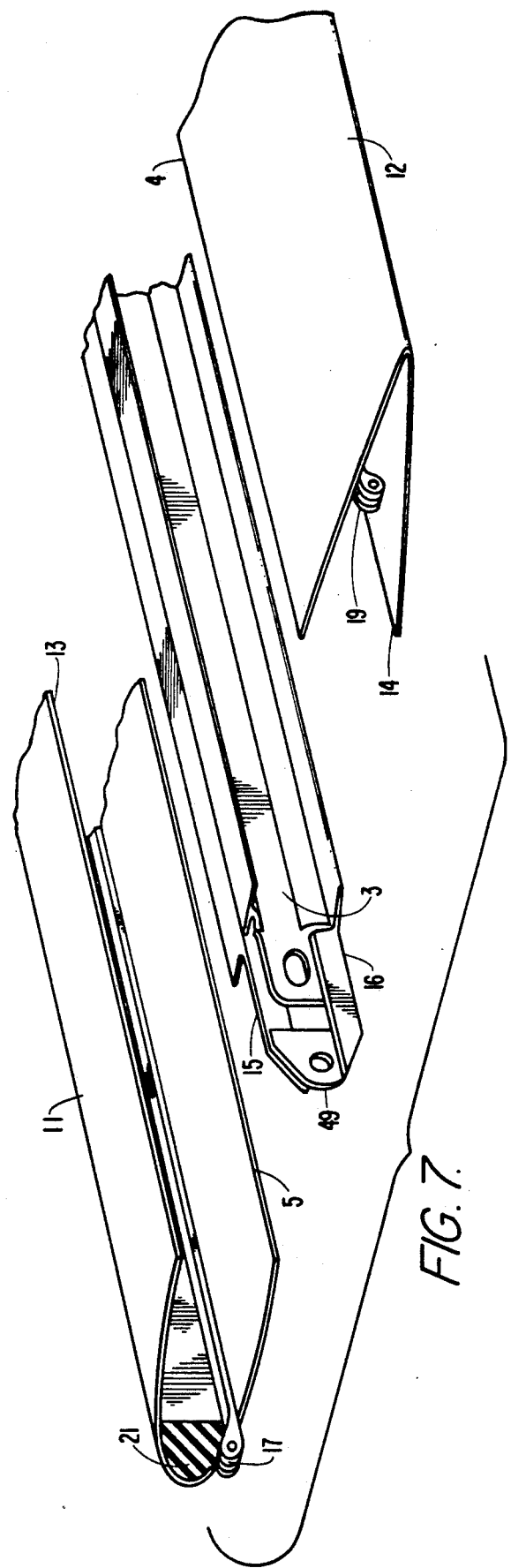
FIG. 7 is an exploded perspective view of an alternate configuration of a torsionally flexible blade.
Figure 8:
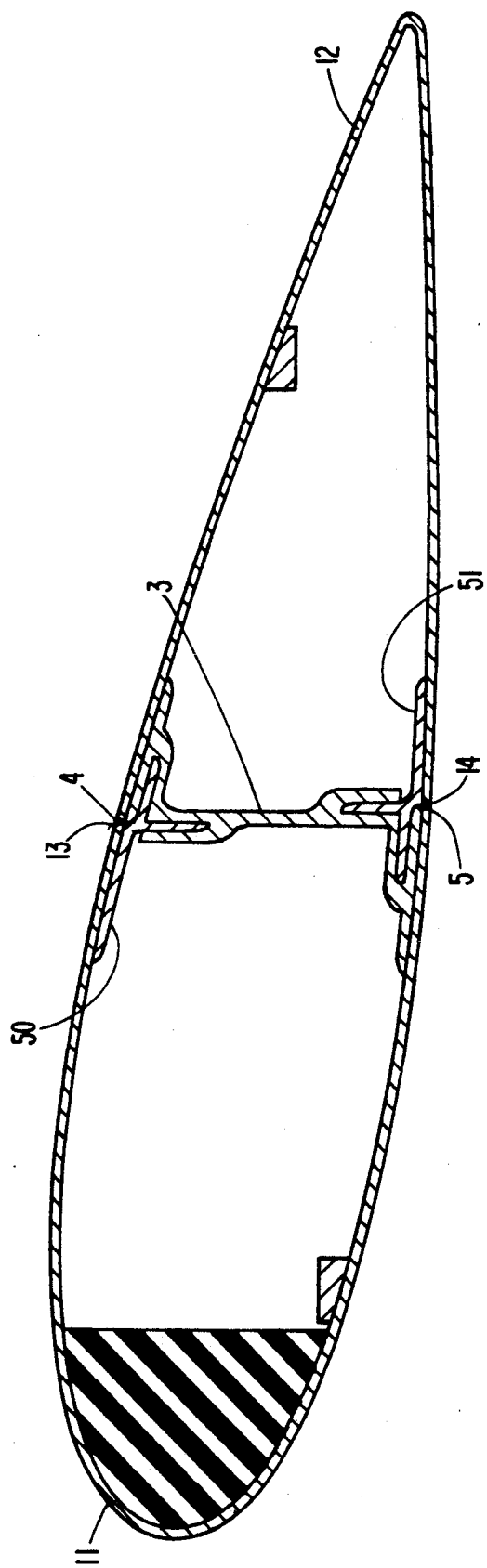
FIG. 8 is a cross-sectional assembled view of the torsionally flexible blade of FIG. 7.

An alternate means of providing the required freedom of movement of spanwise skin edges 13, 14 is illustrated in FIGS. 7 and 8. This assembly comprises main spar 3 (which may be made of extruded aluminum for example) formed with spanwise grooves into which are slidably fitted fins that project from elongated members 50 and 51. These may also be made of extruded aluminum or equivalent. Each of these members preferably consists of three elongated fins merged together approximately perpendicular to each other along one common edge. This configuration effectively resists separation forces in both the chordwise and beamwise directions. The fins of each member hold the member in assembled relationship to main spar 3 but allow relative spanwise motion between said member and the spar. The upper margin of forward skin channel 11 along its edge 13 is permanently secured to member 50. The lower margin of aft skin channel 12 along its edge 14 is secured to member 51. Members 50 and 51 may project from the blade root forming extensions 15, 16 and be joined together at their inboard ends by a gusset 49 so they move together as a unit relative to spar 3. The upper margin of skin channel 12 along its edge 4 and the lower margin of skin channel 11 along its edge 5 are fixedly secured to main spar 3 as shown.

As previously described and shown in FIG. 2, secondary spars 17, 19 may also be installed in the torsionally flexible rotor blade. One spanwise edge of each of these secondary spars may have slidable connection to the blade skin. These slidable connections may be similar to the ones for the main spar described above wherein spanwise grooves in one of either the secondary spar or blade skin are fitted with elongated fins fixedly attached to the other of either the secondary spar or blade skin. These slidable connections preferably extend the full spanwise length of the secondary spar.

The rotary wing shown in FIG. 1 has each torsionally flexible blade mounted with freedom to twist without the pilot having direct control of the blade twist angle. As previously described, however, the pilot does have control of the blade root angle. A conventional torsionally rigid blade mounted as shown would simply follow the angular changes of yoke position produced by the swashplate. With the torsionally flexible blade of this invention, however, yoke 27 only controls the root angle of the blade. The blade tip can have some different angle when the blade twists under the effect of forces imposed upon it. Lifting rotor blades are typically designed to have no net aerodynamic moment about their pitch-change axis during operation. On the other hand, a torsionally flexible rotor blade of the type described will twist under the effects of various dynamic forces that develop whenever the rotor is turning as outlined below.

Chordwise components of centrifugal force tend to twist the blade to minimize tip angle measured relative to the plane of rotation of the rotor. This twisting moment can be derived by reference to FIG. 9 which shows the incremental centrifugal force dCF which develops on each incremental blade element $dx_c$, dr when the rotor turns at angular velocity $\Omega$. This incremental force is a vector which lies along a radial line that passes through the center of the rotor hub. However, this incremental force vector can be resolved into a spanwise component $dCF_s$ and a chordwise component $dCF_c$ as shown. The incremental chordwise component of centrifugal force $dCF_c$ which develops on incremental blade element $dx_c$, dr is always parallel to the plane of rotation of the rotor. Therefore, since this blade element is separated from the blade pitch-change axis by a chordwise distance $x_c$, the following incremental nose-down moment is produced by $dCF_c$ whenever blade spanwise element dr has pitch angle $\theta_r$:

$$-dCF_c x_c \theta_r$$

(In this expression, $\theta_r \approx \theta_H + r/R(\theta_T - \theta_H)$ and the minus sign denotes a nose-down moment).

When these incremental twisting moments are integrated over the entire planview area of a rotor blade which balances about its quarter-chord, the total nose-down moment about the pitch-change axis from chordwise components of centrifugal force is obtained as follows (where $M_B$ is blade mass):

$$-M_B \frac{c^2}{32} \Omega^2 (\theta_T + \theta_H)$$

In this expression, the quantity $M_B c^2/32$ is identical to the expression for twisting moment of inertia $I_{B\text{-}T}$ of a torsionally flexible rotor blade which has a fixed pitch angle at its root and balances about its quarter-chord. Therefore, the nose-down moment from chordwise components of centrifugal force on the torsionally flexible blade is simply:

$$-\Omega^2 I_{B\text{-}T}(\theta_T + \theta_H)$$

Twisting moment from spanwise components of centrifugal force can be derived by reference to FIG. 10. As shown, secondary spars 17 and 19 constitute two parallel spanwise retention members which extend from the root to the tip of the blade. These retention members are preferably spaced a chordwise distance "e" on either side of the blade pitch-change axis and each spanwise segment dr of the blade is effectively attached only to secondary spars 17 and 19. Therefore, these secondary spars provide the total reaction to centrifugal force developed on each spanwise blade segment dr. Since these secondary spars are attached to the hub by bearings mounted on a chordwise axis, they can flap equal and opposite amounts in the beamwise direction relative to the hub arm thereby allowing the blade to twist uniformly from a controlled root pitch angle $\theta_H$ to a different pitch angle $\theta_T$ at the blade tip as shown in FIG. 10.

In the torsionally flexible blade, when pitch angle at the blade tip has a different magnitude than the blade root angle, secondary spars 17 and 19 are twisted and deflected in the beamwise direction. Centrifugal force on the rotor blade then tends to equalize the blade tip pitch angle $\theta_T$ and the root mounting angle $\theta_H$ as shown in the schematic diagram of FIG. 10. If the mass of each blade per foot of radius is $M_B/R$, the incremental centrifugal force on one spanwise blade segment dr when the rotor is turning at angular velocity $\Omega$ is:

$$\Omega^2 \frac{M_B}{R} r\, dr$$

The incremental twisting moment due to this incremental force is:

$$-\frac{e^2}{R^2} \Omega^2 M_B (\theta_T - \theta_H) r\, dr$$

(In deriving this expression it is assumed that $l_r = r - r_1 \approx r$ and $\theta_r \approx \theta_H + r/R (\theta_T - \theta_H)$. The minus sign for the overall expression denotes a nose-down twisting moment).

When this expression is integrated over the entire blade span, the total twisting moment from spanwise centrifugal force on the blade is obtained as follows:

$$-\frac{e^2}{2} \Omega^2 M_B (\theta_T - \theta_H)$$

In addition to the dynamic twisting moments derived above, the torsionally flexible blade does possess some inherent structural stiffness which tends to resist twist of the blade. Therefore, the blade itself acts like a weak torsional spring about its pitch-change axis. Each of the "n" sections of blade skin and spars can be considered to be torsionally equivalent to a rectangular cross-section panel of developed width b and thickness t with length R. The elastic restoring moment which arises from structural stiffness of the blade is then given by the following expression (where G is the shearing modulus of elasticity of the material from which the blade is made):

$$(\theta_H - \theta_T) \frac{1}{3R} \sum_0^n Gbt^3$$

Figure 11:
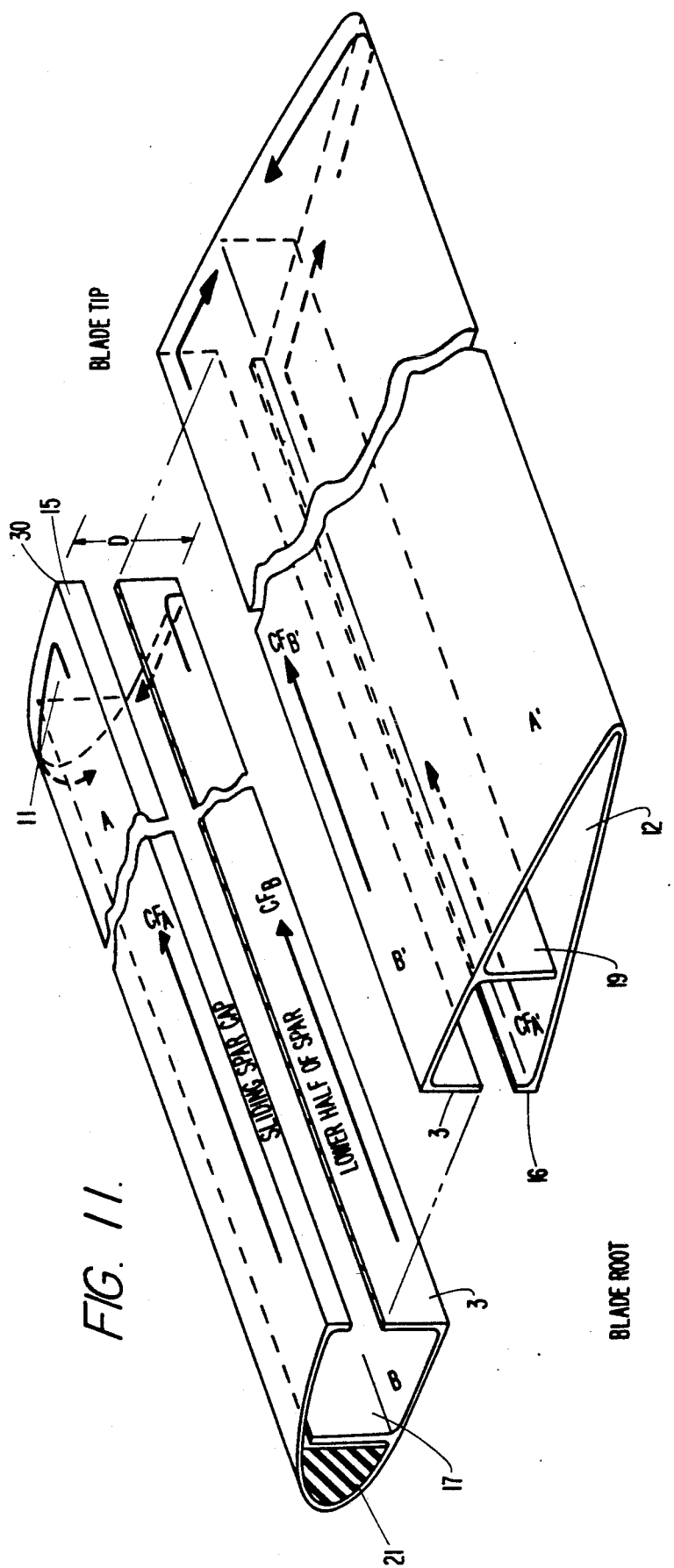
FIG. 11 is a schematic exploded perspective view of one torsionally flexible blade showing torsional moments which develop on the blade due to shear flows.

There is one additional twisting moment on the torsionally flexible rotor blade of this invention which arises from centrifugal force. This results from the unique construction of the blade itself. As previously explained, the rotor blade consists of two channel skin sections each of which hangs on its own false spar (17, 19) as shown in the schematic exploded view in FIG. 11. One of the sliding spar caps (15, 16) is attached to the spanwise edge of each of the large skin panels A and A'. 33 One edge of the main spar 3 is attached to the spanwise edge of each of the small skin panels B and B'. By the theory of shear flows, the total centrifugal force on each one of these panels can be assumed to act along its free edge as shown by the arrows in FIG. 11. Thus, the total centrifugal force on panel (A) is $CF_A$ for example. This includes the centrifugal force on skin 11, leading edge weight 21 and sliding spar cap 15. When force $CF_A$ reaches outer corner 30 of the skin panel, it turns to follow the edge of the panel according to the theory of shear flows. This produces a nose-down twisting moment on the blade tip as shown. The same is true of $CF_{A'}$. Conversely, the forces on the smaller skin panels B and B' produce nose-up twisting moments at the blade tip as shown. A rotor blade of this design can be considered to have a "net mass density" ($\rho_{b\text{-}net}$) which produces a net twisting moment on the blade through the mechanism of shear flows. $\rho_{b\text{-}net}$ may be defined as the sum of mass-per-foot of span of all parts which produce nose-up twisting moments minus the sum of mass-per-foot of span of all parts which produce nose-down twisting moments. Since the blade thickness is D as shown in FIG. 11, the net twisting moment on the blade which arises from $\rho_{b\text{-}net}$ is:

$$M_T = \rho_{b-net} \frac{D}{2} (R_T^2 - R_H^2) \Omega^2$$

It should be noted that for a blade constructed a described herein $\rho_{b\text{-}net}$ will normally have a negative algebraic sign because skin panels A and A' are larger in area (and therefore heavier) than skin panels B and B'. Also, the leading edge weight is attached to skin panel A and therefore adds its weight to that panel. This negative value for $\rho_{b\text{-}net}$ means that centrifugal forces on the skin panels and their attached structure always produce a net nose-down twisting moment at the blade tip through the mechanism of shear flows. To accomplish this desirable result, it is necessary that leading false spar 17 be mounted to the lower portion of skin channel 11 and trailing false spar 19 must be mounted to the upper portion of trailing skin channel 12 as shown in FIG. 11.

The rotary wing shown in FIG. 1 mounts the torsionally flexible blade as a free body in its twisting degree of freedom. Therefore, it must always be in dynamic equilibrium under the influence of all the twisting moments imposed upon it as follows: (Where a +sign for a term indicates a nose-up twisting moment).

$$0 = \Sigma M = -I_{B-T}(\theta_T + \theta_H) + \frac{c^2}{2} M_B(\theta_H - \theta_T) + \left[ \frac{1}{3R\Omega^2} \sum_o^n Gbt^3 \right](\theta_H - \theta_T) + \rho_{b-net} \frac{D}{2} (R_T^2 - R_H^2)$$

All parameters in this equation are physical constants which are fixed by the design of the rotor blade except for $\Omega$ (the rotational speed of the rotor), $\theta_H$ (blade root angle) and $\theta_T$ (blade tip angle). Therefore, for any given combination of rotational speed $\Omega$ and root angle $\theta_H$ this equation can be solved algebraically to determine tip angle $\theta_T$.

For any practical combination of blade design parameters and operating conditions, blade tip angle $\theta_T$ will automatically take a value less than blade root angle $\theta_H$ thereby producing negative twist of the blade. The magnitude of this negative twist angle can be established by the selection of the blade design parameters. Blade twist is also affected by the magnitude of root angle $\theta_H$. In the equation above, the fourth term represents a constant nose-down twisting moment on the blade which is independent of root or tip angle. On the other hand, if root angle $\theta_H$ is increased, the nose-down moment represented by the first term of the equation increases (at any value of tip angle $\theta_T$). This increased nose-down moment must be balanced by the second and third terms in the equation by increasing $(\theta_H - \theta_T)$. However, $(\theta_H - \theta_T)$ is just the negative twist angle between root and tip of the blade. Therefore, negative blade twist angle increases automatically whenever blade root angle $\theta_H$ is increased. Conversely blade twist angle decreases whenever $\theta_H$ is decreased. This is a desirable characteristic for the rotor blades of a tilt-rotor convertiplane as previously explained.

Figure 12:
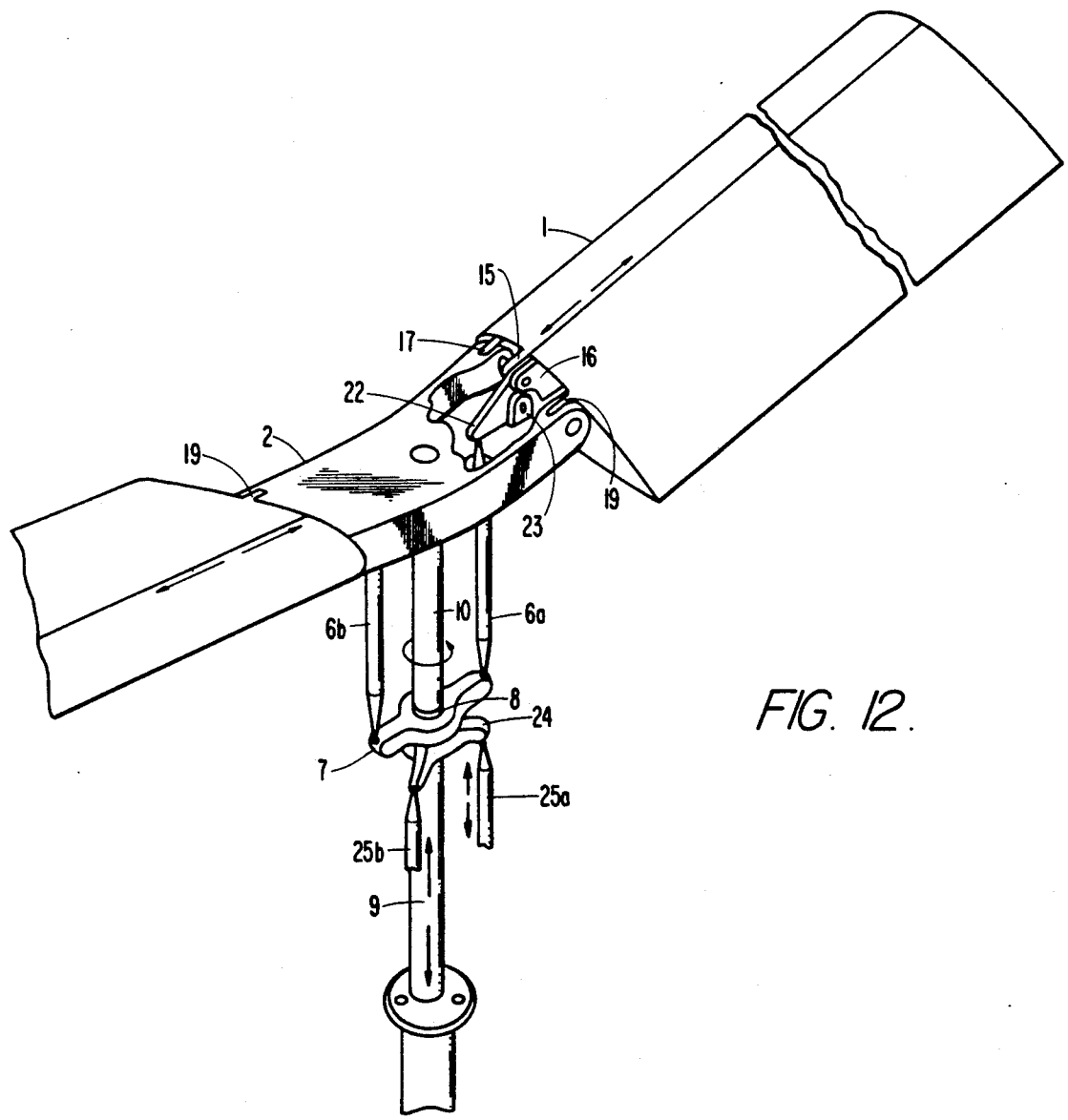
FIG. 12 is a pictorial view of a rotary wing with torsionally flexible blades mounted to a central hub with a fixed root angle.

FIG. 12 shows an alternate configuration for a rotary wing with torsionally flexible blades. In this embodiment of the invention, each blade is mounted directly to one radial arm of a central hub with the blade root angle fixed by its mounting. Both cyclic and collective control are accomplished by twisting the rotor blade. FIGS. 2 and 12 illustrate how the torsionally flexible rotor blade is controlled in this embodiment of the invention. As shown in FIG. 2, free edge 13 of the forward skin channel preferably has a downward extension 15 which lays alongside the forward face of spar 3. Similarly, free edge 14 of the aft skin channel has an upward extension 16 which lays alongside the aft face of spar 3. Extensions 15 and 16 are structurally interconnected by a spacer block or gusset placed between them which causes them to move in unison as one unit. Extensions 15 and 16 of the free skin edges preferably protrude radially inboard a small distance from the blade root and a chordwise hole is drilled through them and their interconnecting block as indicated by the dashed lines in FIG. 2. This provides a point where spanwise control forces can be simultaneously imposed onto both free edges 13 and 14 of the blade channel skin sections. In FIG. 12, inboard extensions of secondary spars 17 and 19 are attached to trunnions on hub 2 by chordwise pins. These pins allow the blade to flap in the beamwise direction and also twist. Skin extensions 15 and 16 project radially inboard of the blade root as shown in FIG. 12 where they are attached by a chordwise pin to the outer end of a bellcrank 22. This bellcrank is mounted through trunnion 23 to hub 2. The inboard end of bellcrank 22 is attached through universal bearing means to vertical pitch link 6a. The opposite end of pitch link 6a is attached through universal bearing means to the outer end of one arm of rotating portion 7 of the swashplate. Pitch links 6a,b are preferably of adjustable length to effect blade tracking. The swashplate assembly (which consists of rotating portion 7 and non-rotating portion 24 coupled together by bearing means) is mounted to tube 9 through spherical bearing 8 for tilt in any direction. The degree of tilt is controlled by push-pull rods 25a and 25b. These push-pull rods may be actuated by any conventional cyclic pitch control mechanism (not shown in FIG. 12).

Whenever bellcrank 22 is rotated from its neutral position, it imposes spanwise forces 26a, 26b on the free edges of the blade skins as shown schematically in FIG. 3. These spanwise forces produce twisting moments on the rotor blade through the mechanism of "shear flows". As shown by the arrows in FIG. 3, spanwise force 26a continues along the length of the blade until it reaches the tip where it turns forward over the leading edge to produce a nose-down twisting moment on the blade. Similarly, spanwise force 26b continues along the length of the blade until it reaches the tip where it turns aft and up over the trailing edge to also produce a nose-down twisting moment on the blade. If bellcrank 22 were rotated in the opposite direction, the direction of forces 26a, 26b would be reversed and the resulting twisting moment would be nose-up instead of nose-down. In FIG. 12, if tube 9 is moved axially along rotor shaft 10 as indicated by the arrows, all blades will be twisted simultaneously to affect collective pitch control. Conversely, if the swashplate is tilted about spherical bearing 8, the blades each twist cyclically once-per-revolution of the rotor to produce cyclic pitch control.

A unique feature of the torsionally flexible rotor blade mounted as shown in FIG. 12 is its suitability for use on a lifting rotor which is driven by reaction jets mounted at the blade tips. In such a jet-driven rotor it is typically required to pass pressurized air up through the central hub and out through the blades to the reaction jets. As illustrated in FIG. 12, the central hub of the rotor in this embodiment of the invention can be made of hollow construction for the ready passage of air therethrough with minimal interference from the structure and control mechanism. Also, as illustrated in FIG. 2, the torsionally flexible blades have an open cross-section throughout their entire length so the blades can serve as ducts for the pressurized air required by the tip jets. For use as ducts in this manner, it is only necessary that the spanwise sliding joints be sealed in some suitable manner which does not interfere with the spanwise relative motion of the parts but does prevent leakage of pressurized air to the surrounding atmosphere through the sliding joints.

I claim:

1. A lifting rotor blade of torsionally flexible construction comprising;
   an open-section spanwise main spar,
   a first spanwise edge of said spar fixedly attached to one spanwise edge of a forward blade skin channel which has contoured cross-section to form the leading portion of the blade airfoil, a second spanwise edge of said spar slidably attached to the opposite spanwise edge of said forward blade skin channel,
   said second spanwise edge of said spar fixedly attached to one spanwise edge of an aft blade skin channel which has contoured cross-section to form the trailing portion of the blade airfoil, and said first spanwise edge of said spar slidably attached to the opposite spanwise edge of said aft blade skin channel,
   the leading blade skin channel fitted with a first spanwise reinforcing structure and the trailing blade skin channel fitted with a second spanwise reinforcing structure, each said reinforcing structure including a root extension for attachment to a central hub.

2. A lifting rotor blade of torsionally flexible construction as described in claim 1 wherein;
   said first spanwise edge of said main spar is fixedly attached to the lowermost spanwise edge of said forward blade skin channel, and
   said second spanwise edge of said main spar is fixedly attached to the uppermost spanwise edge of said trailing blade skin channel.

3. A lifting rotor blade as set forth in claim 1 wherein said leading skin channel reinforcing structure is fixedly attached to the portion of the skin channel projecting forward from its spanwise fixed attachment to the main spar, and
   said trailing skin channel reinforcing structure is fixedly attached to the portion of the skin channel projecting aft from its spanwise fixed attachment to the main spar.

4. A lifting rotor blade as set forth in claim 3 wherein said leading skin channel reinforcing structure comprises a spanwise secondary spar having one edge fixedly attached to the portion of the skin channel projecting forward from its spanwise fixed attachment to the main spar, and a second edge slidably attached to the portion of the skin channel projecting forward from its spanwise slidable attachment to the main spar, and
   said trailing skin channel reinforcing structure comprises a spanwise secondary spar having one edge fixedly attached to the portion of the skin channel projecting aft from its spanwise fixed attachment to the main spar, and a second edge slidably attached to the portion of the skin channel projecting aft from its spanwise slidable attachment to the main spar.

5. A lifting rotor blade with spanwise secondary spars as described in claim 4 wherein said slidable attachment between each secondary spar and each blade skin comprises a piano hinge assembly with one flap of the hinge fixedly attached to the blade skin and the other flap of the hinge fixedly attached to the secondary spar,
   the hinge loops of at least one flap of said piano hinge shortened to allow spanwise relative motion between the two flaps of the hinge when assembled onto a common spanwise hinge pin,
   said piano hinge means extending the entire length of the secondary spar.

6. A lifting rotor blade having spanwise secondary spars as described in claim 4 wherein said slidable attachment between each secondary spar and each blade skin comprises;
   spanwise grooves in one of either the secondary spar or the blade skin into which are slidably fitted elongated fins which are fixedly mounted in the other of either the secondary spar or blade skin,
   said grooves and fins extending the entire spanwise length of the secondary spar.

7. A lifting rotor blade with leading and trailing spanwise reinforcing structure as described in claim 1,
   the root end of each reinforcing structure projecting inboard from the root end of the blade and including trunnion means for attachment to a central hub.

8. Leading and trailing spanwise reinforcing structures as described in claim 7 wherein said structures are spaced equidistant on either side of the blade pitch-change axis.

9. A lifting rotor blade as described in claim 1 with a torsionally flexible balance weight mounted inside the leading edge blade skin channel whereby the center of gravity of each spanwise blade segment coincides with the blade torsional axis.

10. A lifting rotor blade of torsionally flexible construction comprising:
    an opensection spanwise main spar,
    a first spanwise edge of said spar fixedly attached to one spanwise edge of a forward blade skin channel which has contoured cross-section to form the leading portion of the blade airfoil, a second spanwise edge of said spar slidably attached to the opposite spanwise edge of said forward blade skin channel,
    said second spanwise edge of said spar fixedly attached to one spanwise edge of an aft blade skin channel which has contoured cross-section to form the trailing portion of the blade airfoil, and said first spanwise edge of said spar slidably attached to the opposite spanwise edge of said aft blade skin channel,
    wherein said slidable attachments between spanwise edges of said blade skin channels and said main spar comprise;
    spar caps fixedly attached to spanwise edges of the blade skin channels,
    each spar cap comprising one flap of a piano hinge with its hinge loops cooperatively interspersed between multiple retention means spaced along upper and lower extremities of the spar,
    said retention means including a spanwise pin threaded through said hinge loops and fixedly attached to the spar at spanwise points between said hinge loops,
    said hinge loops having lesser spanwise length than the spanwise separation between said retention means thereby allowing spanwise relative motion between spar cap and spar,
    said attachment means extending the entire length of the rotor blade,
    the leading blade skin channel fitted with a first spanwise reinforcing structure and the trailing blade skin channel fitted with a second spanwise reinforcing structure, each said reinforcing structure including a root extension for attachment to a central hub.

11. A lifting rotor blade of torsionally flexible construction comprising:

an open-section spanwise main spar,
a first spanwise edge of said spar fixedly attached to one spanwise edge of a forward blade skin channel which has contoured cross-section to form the leading portion of the blade airfoil, a second spanwise edge of said spar slidably attached to the opposite spanwise edge of said forward blade skin channel,
said second spanwise edge of said spar fixedly attached to one spanwise edge of an aft blade skin channel which has contoured cross-section to form the trailing portion of the blade airfoil, and said first spanwise edge of said spar slidably attached to the opposite spanwise edge of said aft blade skin channel,
wherein said slidable attachments between spanwise edge of said blade skin channels and said main spar comprises;
spanwise grooves in the spar into which are slidably fitted elongated fins which merge together and are fixedly attached along one common edge of each blade skin channel,
said fins being approximately perpendicular to each other to resist separation forces in both the chordwise and beamwise directions,
said grooves and fins extending the entire spanwise length of the lifting rotor blade,
the leading blade skin channel fitted with a first spanwise reinforcing structure and the trailing blade skin channel fitted with a second spanwise reinforcing structure, each said reinforcing structure including a root extension for attachment to a central hub.

12. A lifting rotor blade of torsionally flexible construction as described in claim 10 attached to a central hub which includes a radial arms of circular cross-section with a rotatable yoke mounted to each arm by axial thrust bearing means,
said yoke having at least one trunnion at its outer end fitted with a transverse axle,
the root extension of one blade skin channel reinforcing structure attached by radial bearing means for rotation about the forward extension of said axle, and
the root extension of the other blade skin channel reinforcing structure attached by radial bearing means for rotation about the aft extension of said axle.

13. A lifting rotary wing as described in claim 12 including;
a torsionally flexible rotor blade mounted to a rotatable yoke on a central hub, a pitch control horn fixedly attached to said yoke,
pin-ended links connected by universal bearing means to said pitch horns and to radial arms of the rotating portion of a swashplate which is concentric with the rotor shaft and consists of said rotating portion and a non-rotating portion coupled together by bearing means,
the rotating portion of said swashplate driven by the rotor shaft in synchronism therewith and the non-rotating portion of said swashplate mounted through spherical bearing means to an axially moveable member whereby axial movement of said member affects collective adjustment of blade root angle and tilt of said swashplate affects cyclic adjustment of blade root angle.

14. A lifting rotary wing with torsionally flexible blades having control means as described in claim 13 wherein the length of each pin-ended link is adjustable to affect blade tracking.

15. A lifting rotor blade of torsionally flexible construction as described in claim 10 attached to a central structural hub which includes radial structure for mounting each blade,
said structure having trunnions at its outer end,
the root extension of one spanwise blade reinforcing structure attached by radial bearing means to the forward trunnion of said hub structure for rotation about a chordwise axis, and
the root extension of the other spanwise blade reinforcing structure attached by radial bearing means to the aft trunnion of said hub structure for rotation about a chordwise axis.

16. A torsionally flexible lifting rotor blade mounted to central hub structure as described in claim 15 wherein the edges of blade skin channels having spanwise freedom to slide relative to the blade spar are interconnected by gusset means to move in unison relative to said main spar,
said interconnecting gusset pivotally attached to a control bellcrank mounted to the rotor hub for rotation about a chordwise axis whereby rotation of said bellcrank about said axis is coupled with spanwise displacement of said slidable edges of said skin channels,
pin-ended links connected by universal bearing means to said bellcranks and to radial arms of the rotating portion of a swashplate which is concentric with the rotor shaft and consists of said rotating portion and a non-rotating portion coupled together by bearing means,
the rotating portion of said swashplate driven by the rotor shaft to rotate in synchronism therewith and the nonrotating portion of said swashplate mounted through spherical bearing means to an axially moveable member whereby axial movement of said member affects collective adjustment of blade twist and tilt of said swashplate affects cyclic adjustment of blade twist.

17. A lifting rotary wing with torsionally flexible blades having pitch control means as described in claim 16 wherein the length of each pin-ended pitch link is adjustable to affect blade tracking.

18. A tiltrotor convertiplane comprising a fixed-wing airplane with powered, opposite-rotating rotary wings mounted at its wing tips through journal bearing means for tilt of the rotor drive shafts from a position essentially perpendicular to the fixed-wing chord to a position essentially parallel to the fixed-wing chord,
said rotary wings being helicopter rotors when their drive shafts are perpendicular to the fixed-wing chord converting to airplane propellers when their drive shafts are parallel to the fixed-wing chord, wherein
the rotor blades of said rotary wings are twistable from root to tip and have adjustable blade root angle, said twist angle and root angle being of smallest magnitude when the rotors are in helicopter configuration and being of largest magnitude when the rotors are in propeller configuration,
each said twistable blade of said convertiplane comprising;
an open-section spanwise main spar, a first spanwise edge of said spar fixedly attached to one spanwise edge of a forward blade skin channel which has contoured cross-section to form the leading portion of the blade airfoil, a second spanwise edge of said spar slidably attached to the opposite spanwise edge of said forward blade skin channel, said second spanwise edge of said spar fixedly attached to one spanwise edge of an aft blade skin channel which has contoured cross-section to form the trailing portion of the blade airfoil, and said first spanwise edge of said spar slidably attached to the opposite spanwise edge of said aft blade skin channel, the leading blade skin channel fitted with a first spanwise reinforcing structure and the trailing blade skin channel fitted with a second spanwise reinforcing structure, each said reinforcing structure including a root extension for attachment to a central hub.

19. A lifting rotor blade of torsionally flexible construction as described in claim 11 attached to a central hub which includes radial arms of circular cross-section with a rotatable yoke mounted to each arm by axial thrust bearing means, said yoke having at least one trunnion at its outer end fitted with a transverse axle, the root extension of one blade skin channel reinforcing structure attached by radial bearing means for rotation about the forward extension of said axle, and the root extension of the other blade skin channel reinforcing structure attached by radial bearing means for rotation about the aft extension of said axle.

20. A lifting rotary wing as described in claim 19 including;

a torsionally flexible rotor blade mounted to a rotatable yoke on a central hub, a pitch control horn fixedly attached to said yoke, pin-ended links connected by universal bearing means to said pitch horns and to radial arms of the rotating portion of a swashplate which is concentric with the rotor shaft and consists of said rotating portion and a non-rotating portion coupled together by bearing means, the rotating portion of said swashplate driven by the rotor shaft in synchronism therewith and the non-rotating portion of said swashplate mounted through spherical bearing means to an axially moveable member whereby axial movement of said member affects collective adjustment of blade root angle and tilt of said swashplate affects cyclic adjustment of blade root angle.

21. A lifting rotary wing with torsionally flexible blades having control means as described in claim 20 wherein the length of each pin-ended link is adjustable to affect blade tracking.

22. A lifting rotor blade of torsionally flexible construction as described in claim 11 attached to a central structural hub which includes radial structure for mounting each blade, said structure having trunnions at its outer end, the root extension of one spanwise blade reinforcing structure attached by radial bearing means to the forward trunnion of said hub structure for rotation about a chordwise axis, and the root extension of the other spanwise blade reinforcing structure attached by radial bearing means to the aft trunnion of said hub structure for rotation about a chordwise axis.

23. A torsionally flexible lifting rotor blade mounted to central hub structure as described in claim 22 wherein the edges of blade skin channels having spanwise freedom to slide relative to the blade spar are interconnected by gusset means to move in unison relative to said main spar, said interconnecting gusset pivotally attached to a control bellcrank mounted to the rotor hub for rotation about a chordwise axis whereby rotation of said bellcrank about said axis is coupled with spanwise displacement of said slidable edges of said skin channels, pin-ended links connected by universal bearing means to said bellcranks and to radial arms of the rotating portion of a swashplate which is concentric with the rotor shaft and consists of said rotating portion and a non-rotating portion coupled together by bearing means, the rotating portion of said swashplate driven by the rotor shaft to rotate in synchronism therewith and the non-rotating portion of said swashplate mounted through spherical bearing means to an axially moveable member whereby axial movement of said member affects collective adjustment of blade twist and tilt of said swashplate affects cyclic adjustment of blade twist.

24. A lifting rotary wing with torsionally flexible blades having pitch control means as described in claim 23 wherein the length of each pin-ended link is adjustable to affect blade tracking.

* * * * *

UNITED STATES PATENT AND TRADEMARK OFFICE
CERTIFICATE OF CORRECTION

PATENT NO. : 5,137,228
DATED : August 11, 1992
INVENTOR(S) : Jack F. Vaughen

It is certified that error appears in the above-indentified patent and that said Letters Patent is hereby corrected as shown below:

Column 3, line 28  "26b" should be "25b"

Column 4, line 19  "balanced" should be "balance"

Column 7, line 22  In the equation on this line, "$I_{B-1}$" should be "$I_{B-T}$"

Column 8, line 32  Delete the number "33"

Column 8, line 60  Between "constructed" and "de-", "a" should be changed to "as"

Column 13, line 18  "comprises" should be "comprise"

Column 13, line 37  Between "includes" and "radial" delete "a"

Signed and Sealed this

Sixteenth Day of November, 1993

Attest:

BRUCE LEHMAN

Attesting Officer　　Commissioner of Patents and Trademarks